United States Patent
Norboe (10) Patent No.: US 11,673,259 B2
(45) Date of Patent: Jun. 13, 2023

(54) MULTI-STAGE STOP DEVICES FOR ROBOTIC ARMS

(71) Applicant: OMRON Corporation, Kyoto (JP)

(72) Inventor: Daniel P. Norboe, Alameda, CA (US)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 17/593,164

(22) PCT Filed: Mar. 11, 2020

(86) PCT No.: PCT/US2020/022152
§ 371 (c)(1),
(2) Date: Sep. 10, 2021

(87) PCT Pub. No.: WO2020/190594
PCT Pub. Date: Sep. 24, 2020

(65) Prior Publication Data
US 2022/0184798 A1     Jun. 16, 2022

Related U.S. Application Data

(60) Provisional application No. 62/818,948, filed on Mar. 15, 2019.

(51) Int. Cl.
*B25J 9/10*     (2006.01)
*B25J 9/04*     (2006.01)
(Continued)

(52) U.S. Cl.
CPC ............ *B25J 9/101* (2013.01); *B25J 9/0012* (2013.01); *B25J 9/042* (2013.01); *B25J 17/025* (2013.01)

(58) Field of Classification Search
CPC .......... B25J 9/042; B25J 9/101; B25J 17/025; Y10T 74/2063
See application file for complete search history.

(56) References Cited

U.S. PATENT DOCUMENTS 4,632,632 A * 12/1986 Simone ............... B25J 9/08
901/17
4,816,955 A * 3/1989 Bruns ............... B23Q 16/04
200/47
(Continued)

FOREIGN PATENT DOCUMENTS

DE           971313 C      1/1959
DE     10 2014 220166 A1  4/2016
(Continued)

OTHER PUBLICATIONS

Search Report and Written Opinion received in International Application No. PCT/US2020/22152, dated Aug. 12, 2020.
(Continued)

*Primary Examiner* — Jake Cook
*Assistant Examiner* — Gregory T Prather
(74) *Attorney, Agent, or Firm* — Knobbe Martens Olson & Bear LLP (57) ABSTRACT

This application describes multi-stage stop devices for robotic arms. During a first stage, rotational motion of a link of a robotic arm compresses a compressible member of the multi-stage stop device to absorb and dissipate at least some of the force generated by the collision. A second stage provides a hard stop the stops any further rotation. The multi-stage stop devices described herein can include a collapsing pin configured to compress a compressible member during the first stage. After the pin has collapsed a rigid sidewall provides a hard stop preventing further rotation during the second stage.

19 Claims, 7 Drawing Sheets

(51) Int. Cl.
  *B25J 17/02*   (2006.01)
  *B25J 9/00*    (2006.01)

(56) References Cited

U.S. PATENT DOCUMENTS

| | | | |
|---|---|---|---|
| 4,828,094 A * | 5/1989 | Torii | B25J 9/101 |
| | | | 192/139 |
| 4,934,504 A | 6/1990 | Torii et al. | |
| 5,193,658 A | 3/1993 | Tellden | |
| 5,839,322 A | 11/1998 | Genov et al. | |
| 6,065,364 A * | 5/2000 | Shiraki | B25J 9/101 |
| | | | 74/526 |
| 6,388,553 B1 * | 5/2002 | Shea | H01C 7/126 |
| | | | 337/167 |
| 9,796,098 B2 | 10/2017 | Ootani | |
| 2011/0072918 A1 | 3/2011 | Reekers | |
| 2018/0104074 A1 * | 4/2018 | van der Merwe | A61F 2/68 |
| 2020/0009723 A1 * | 1/2020 | Eisenwinter | B25J 9/101 |

FOREIGN PATENT DOCUMENTS

| | | |
|---|---|---|
| EP | 0327096 A1 | 8/1989 |
| JP | S 62-19392 A | 1/1987 |
| JP | H02-160497 A | 6/1990 |
| JP | H 2-232191 A | 9/1990 |
| JP | H05-228882 A | 9/1993 |
| JP | H 10-202574 A | 8/1998 |
| JP | H 10-296680 A | 11/1998 |
| WO | WO 2018/162492 A1 | 9/2018 |

OTHER PUBLICATIONS

Supplementary European Search Report for European Application No. EP 20 77 4491 dated Nov. 17, 2022.

* cited by examiner

MULTI-STAGE STOP DEVICES FOR ROBOTIC ARMS

PRIORITY APPLICATION(S)

This application claims the benefit of U.S. Provisional Application No. 62/818,948, filed Mar. 15, 2019, which is hereby incorporated by reference in its entirety.

BACKGROUND

Field

This application relates to robotic systems, and in particular, to multi-stage stop devices, systems, and methods for mechanically limiting and/or stopping rotation of robotic arms or other components.

Description

Robotic arms may be used to perform various tasks, and are particularly common in automation. Robotic arms typically comprise a plurality of links connected by one or more joints. The one or more joints are driven by various types of actuators (e.g., electric motors, hydraulics, etc.) to control articulation of the robotic arm to position an end effector that is configured to perform a task. In some instances, robotic arms can include physical stop devices (e.g., hard stops) that can be configured to limit rotational motion between links of the arm. Such stop devices can limit damage to the robotic arm or injury to others in the event of a failure of the robotic arm.

SUMMARY

This application describes multi-stage stop devices (as well as related systems and methods) that are configured for use with robotic arms and other robotic systems. The multi-stage stop devices can be configured to provide a mechanical mechanism for limiting rotation at a rotational joint of the robotic arm at which the multi-stage stop device is installed. In some embodiments, the multi-stage stop devices can be used as a mechanical safety mechanism that stops or limits rotation of the robotic arm in the event of a failure.

The multi-stage stop devices described herein are referred to as "multi-stage" because, as will be described below, they include two stages for stopping rotational motion. During a first stage, the rotational motion compresses a compressible member to absorb and dissipate at least some of the force generated by the collision. A second stage provides a hard stop that stops any further rotation. The multi-stage stop devices described herein can include a collapsing pin configured to compress the compressible member during the first stage. After the pin has collapsed, a rigid sidewall of a multi-stage stop device provides a hard stop preventing further rotation during the second stage.

As a first example, a multi-stage stop device for a robotic arm can include a frame member configured to mount to one of a first link and a base of a robotic arm. The first link and the base are connected by a rotational joint such that the first link rotates relative to the base. The frame member includes a first sidewall defining a first opening therethrough. The multi-stage stop device includes a compressible member positioned within the frame member. The multi-stage stop device also includes a first pin comprising a first shaft extending from a first head to a first distal end. The first shaft is slidably received within the first opening of the first sidewall and the first head is positioned between the first sidewall and the compressible member.

In some embodiments, the multi-stage stop device can include one or more of the following features, in any combination: (a) wherein a first force acting on the first distal end of the first pin causes the first pin to move towards the compressible member, compressing the compressible member to absorb the first force; (b) wherein contact between the frame member and a protruding member on the one of the first link and the base stops rotation of the first link relative to the base; (c) wherein the frame member further comprises a second sidewall defining a second opening therethrough, and the device further comprises a second pin comprising a second shaft extending from a second head to a second distal end, wherein the second shaft is slidably received within the second opening of the second sidewall and the second head is positioned between the second sidewall and the compressible member; (d) wherein a second force acting on the second distal end of the second pin causes the second pin to move towards the compressible member, compressing the compressible member to absorb the second force; (e) wherein the compressible member comprises a block of rubber having a shore hardness of at least 40 A; (f) wherein the frame member comprises a keyed-profile configured to correspond with a keyed-recess of the one of the first link and the base of the robotic arm to which the frame member is configured to mount, and when mounted to the one of the first link and the base of the robotic arm, the frame member is at least partially received within the keyed-recess; (g) a mechanical fastener extending through the frame member for mounting the frame member to the one of the first link and the base of the robotic arm; (h) wherein the frame member is configured to mount to the first link of the robotic arm; (i) wherein the first head comprises a shape that is larger than the first opening; and/or any of the additional features described in the detailed description section below.

As another example, a robotic system can include a first link of a robotic arm connected to a base of the robotic arm by a rotational joint such that the first link rotates relative to the base. The robotic system also includes a multi-stage stop device. The multi-stage stop device includes a frame member mounted to one of the first link and the base, the frame member comprising a first sidewall defining a first opening therethrough, a compressible member positioned within the frame member, and a first pin comprising a first shaft extending from a first head to a first distal end, wherein the first shaft is slidably received within the first opening of the first sidewall and the first head is positioned between the first sidewall and the compressible member. The robotic system also includes a first protruding member mounted to the other of the first link and the base. The first protruding member is positioned so as to contact the first distal end of the first pin at a first rotational position of first link relative to the base to limit rotation of the first link in a first rotational direction.

In some embodiments, the robotic system can include one or more of the following features, in any combination: (a) wherein the first protruding member comprises a bolt; (b) wherein the frame member further comprises a second sidewall defining a second opening therethrough, and the device further comprises a second pin comprising a second shaft extending from a second head to a second distal end, wherein the second shaft is slidably received within the second opening of the second sidewall and the second head is positioned between the second sidewall and the compressible member; (c) wherein the first protruding member contacts the second distal end of the second pin at a second rotational position to limit rotation of the first link in a second rotational direction; (d) a second protruding member mounted to the other of the first link and the base, the second protruding member positioned so as to contact the second distal end of the second pin at a second rotational position of first link relative to the base to limit rotation of the base in a second rotational direction; (e) wherein the second protruding member comprises a bolt; (f) wherein positions of the first and second protruding members are adjustable; (g) wherein the one of the first link and the base comprises a keyed-recess, the frame member comprises a keyed-profile configured to correspond to the keyed-recess, and the frame member is at least partially received within the keyed-recess; (h) a mechanical fastener extending through a mounting opening of the frame member and into the one of the first link and the base to mount the frame member to the one of the first link and the base; (i) wherein the frame member is mounted to an internal portion of a housing of the one of the first link and the base; (j) wherein the frame member is mounted to the first link; (k) wherein the compressible member comprises a block of rubber having a shore hardness of at least 40 A; and/or any of the additional features described in the detailed description section below.

BRIEF DESCRIPTION OF THE DRAWINGS

The features and advantages of the multi-stage stop devices, systems, and methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

FIGS. 7A-7C illustrate the function of the multi-stage stop device of FIG. 2A according to one embodiment.

DETAILED DESCRIPTION

The features of the multi-stage stop devices, systems, and methods of the present disclosure will now be described in detail with reference to certain embodiments illustrated in the figures. The illustrated embodiments described herein are provided by way of illustration and are not meant to be limiting. Other embodiments can be utilized, and other changes can be made, without departing from the spirit or scope of the subject matter presented. It will be readily understood that the aspects and features of the present disclosure described below and illustrated in the figures can be arranged, substituted, combined, and designed in a wide variety of different configurations by a person of ordinary skill in the art, all of which are made part of this disclosure.

Figure 1:
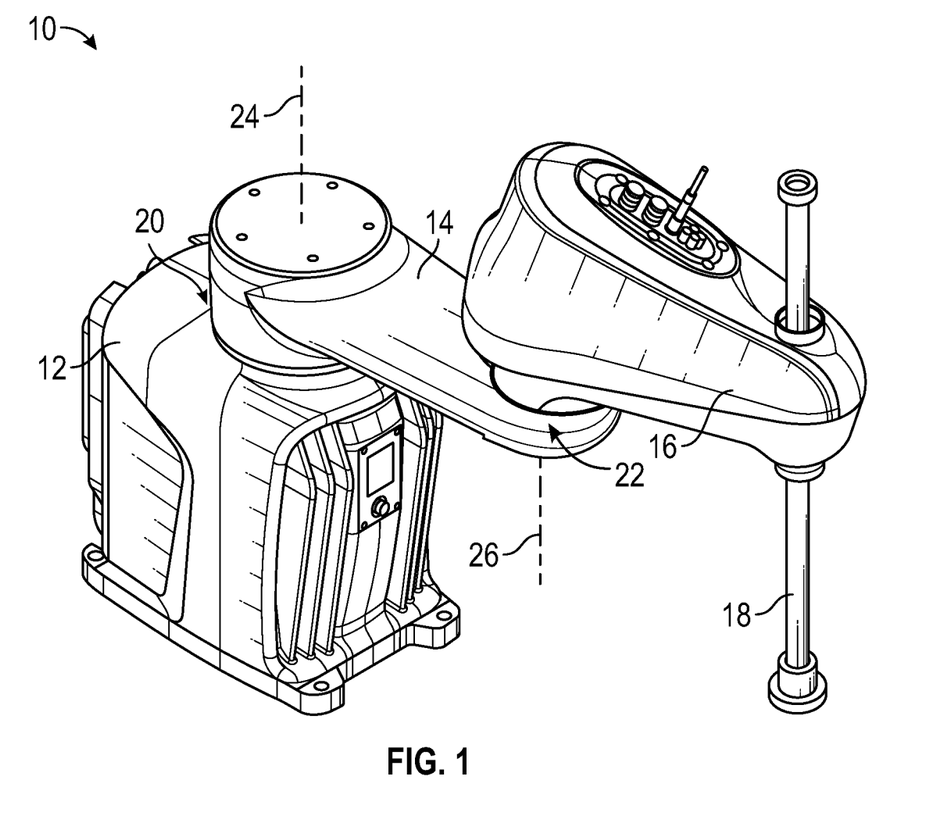
FIG. 1 is an isometric view of an embodiment of a robotic arm.

FIG. 1 is an isometric view of an embodiment of a robotic arm 10 that can include a multi-stage stop device 100 as described herein. In the illustrated embodiment, the multi-stage stop device 100 is not visible in FIG. 1. The multi-stage stop device 100 is shown, for example, in FIGS. 2A-2C, which are described further below. As shown in FIG. 1, in the illustrated embodiment, the robotic arm 10 includes a base 12, a first link 14, a second link 16, and an end effector 18. The multi-stage stop device 100 described further below can also be used on other types of robotic arms or systems. The illustrated robotic arm 10 is provided by way of example only.

The base 12 can be configured to support the other portions of the robotic arm 10. In some embodiments, the base 12 houses many of the electronic components for the robotic arm 10. The first link 14 can be connected to the base 12 by a first rotational joint 20. The first rotational joint 20 allows the first link 14 to rotate relative to the base 12. In the illustrated embodiment, the first link 14 rotates relative to the base 12 about a first axis of rotation 24. In general, rotation of the first link 14 relative to the base 12 may be controlled through the execution of one or more sequences of instructions (i.e., software) and/or by customized hardware (e.g., application-specific integrated circuit(s), field-programmable gate array(s), etc.). However, it may be beneficial or required to provide a mechanical mechanism for limiting or stopping rotation of the first link 14 relative to the base 12, for example, in the event of a failure of the robotic arm 10. The multi-stage stop device 100 described in this application can be included at the first rotational joint 20 to provide this functionality. For example, the multi-stage stop device 100 can be included at the first rotational joint 20 to limit or stop rotation of the first link 14 relative to the base 12.

With continued reference to FIG. 1, the second link 16 is connected to the first link 14 by a second rotational joint 22. The second rotational joint 22 allows the second link 16 to rotate relative to the first link 14. In the illustrated embodiment, the second link 16 rotates relative to the first link 14 about a second axis of rotation 26. Again, in general, rotation of the second link 16 relative to the first link link 14 may be controlled or limited by software or customized hardware. It may, however, be beneficial or required to provide a mechanical mechanism for limiting or stopping rotation of the second link 16 relative to the first link 14 in the event of a failure of the robotic arm 10. The multi-stage stop device 100 described below can, in some embodiments, be included at the second rotational joint 22 to provide this functionality. For example, the multi-stage stop device 100 can be included at the second rotational joint 22 to limit or stop rotation of the second link 16 relative to the first link 14. In some embodiments, a different type of stop device can be included at the second rotational joint 22.

In the illustrated embodiment, the base 12, first link 14, and second link 16 are arranged to form a selective compliance assembly robot arm (SCARA). The multi-stage stop device 100 may be used at any of the rotational joints of a SCARA. The multi-stage stop device 100 may also be configured for use with other types of robotic arms (e.g., non-SCARA robotic arms).

In the illustrated embodiment of FIG. 1, the robotic arm 10 includes an end effector 18. In this embodiment, the end effector 18 is positionable by rotating the first and/or second links 14, 16 about the first and/or second rotational axes 24, 26. The end effector 18 can be configured to perform various tasks as will be apparent to those of ordinary skill in the art.

In many of the examples described below, the multi-stage stop device 100 is described with reference to the first rotational joint 20 between the first link 14 and the base 12. This is done for ease of description with the understanding that the multi-stage stop device 100 can alternatively or additionally be used at any other rotational joint of the robotic arm 10.

Figure 2A:
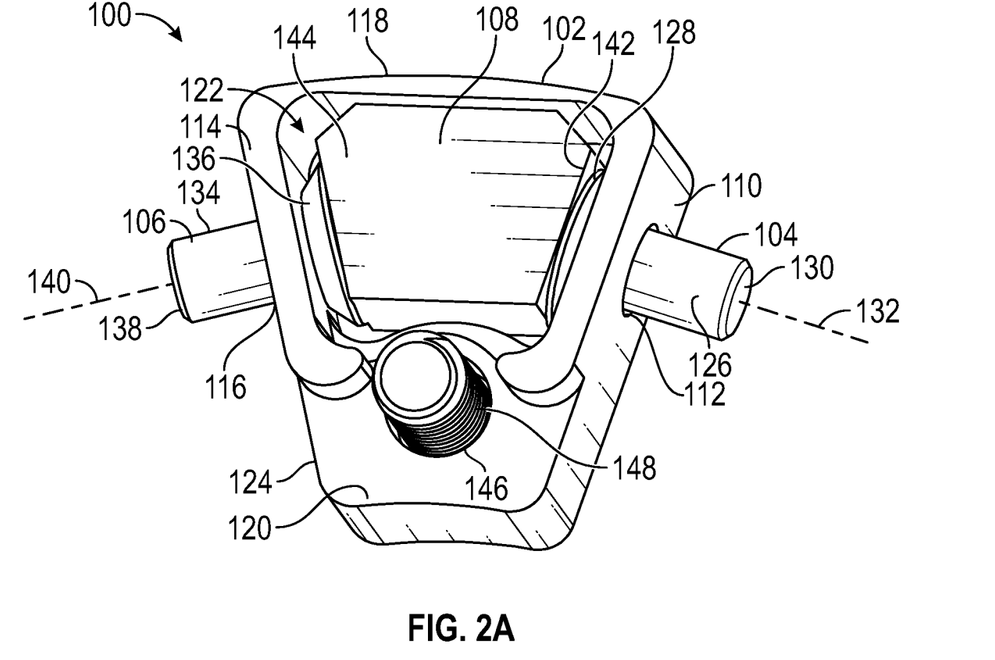
FIG. 2A is a top perspective view of an embodiment of a multi-stage stop device that can be configured for use, for example, with the robotic arm of FIG. 1.
Figure 2B:
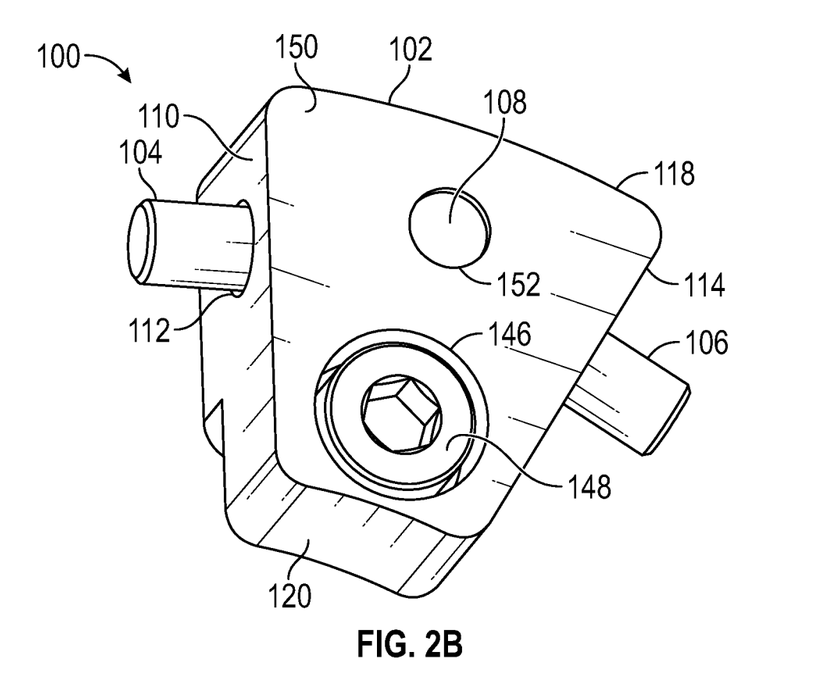
FIG. 2B is a bottom perspective view of the multi-stage stop device of FIG. 2A.
Figure 2C:
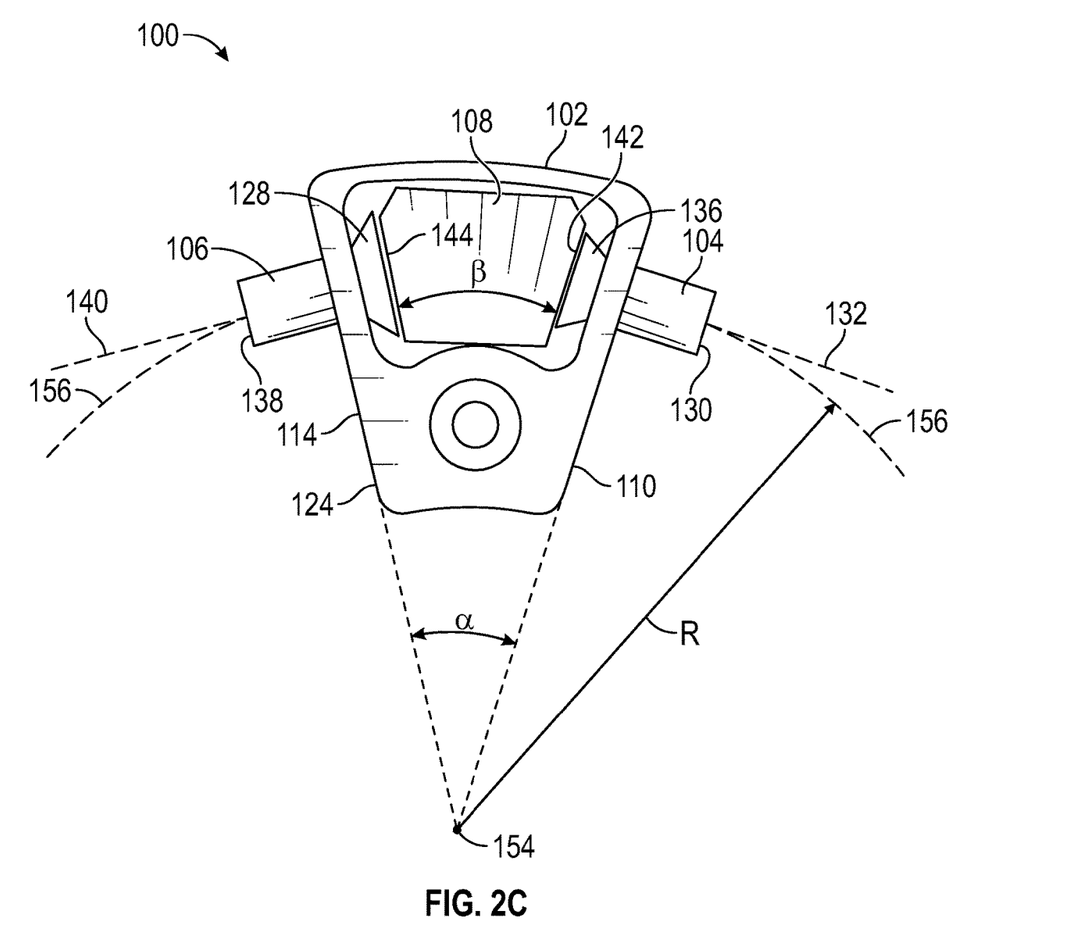
FIG. 2C is a top view of the multi-stage stop device of FIG. 2A.

FIGS. 2A-2C illustrate an embodiment of the multi-stage stop device 100 according to the present disclosure. FIG. 2A is a top perspective view, FIG. 2B is a bottom perspective view, and FIG. 2C is a top view of the multi-stage stop device 100.

As mentioned above, the multi-stage stop device 100 can be configured to stop or limit rotation at a rotational joint of a robotic arm or system, such as the robotic arm 10 illustrated in FIG. 1 or others. For example, with reference to the robotic arm 10 of FIG. 1, the multi-stage stop device 100 can be installed at the first rotational joint 20 to stop or limit rotation of the first link 14 relative to the base 12 and/or the multi-stage stop device 100 can be installed at the second rotational joint 22 to stop or limit rotation of the second link 16 relative to the first link 14. Example installation of the multi-stage stop device 100 will be described in greater detail below with reference to FIGS. 3-5.

In the illustrated embodiment of FIGS. 2A-2C, the multi-stage stop device 100 includes a frame member 102, a first pin 104, a second pin 106, and a compressible member 108. These features will now be described in more detail.

The frame member 102 can comprise a body or housing for the multi-stage stop device 100. In the illustrated embodiment, the frame member 102 comprises a single, unitary piece. In some embodiments, the frame member 102 may comprise more than one piece joined together to form the frame member 102. The frame member 102 may be made from a strong, rigid material, such as many types of metals. In some embodiments, the frame member 102 is made from steel.

As shown in FIG. 2A, in the illustrated embodiment, the frame member 102 includes a first sidewall 110. The first sidewall 110 can include a first opening 112 defined therein. That is, the first opening 112 can be formed through and extend through the first sidewall 110. As illustrated, in some embodiments, the first opening 112 extends along a first pin axis 132. The first opening 112 can be configured to receive the first pin 104 therethrough. For example, as illustrated, the first pin 104 extends through the first opening 112 and through the first sidewall 110 of the frame member 102. The first opening 112 can be configured such that the first pin 104 is slidingly received within the first opening 112. To this end, in some embodiments, the first opening 112 can be slightly larger (e.g., being about 1%, 2.5%, 5%, 10%, 15%, or 20% larger in terms of cross-sectional area, diameter, etc.) than the first pin 104 so as to allow the first pin 104 to slide back and forth through the first opening 112 along the first pin axis 132. In the illustrated embodiment, the first opening 112 is shown with a circular cross-section that corresponds to the circular cross-section of the first pin 104. In general, the cross-section of the first opening 112 is configured to correspond to the cross-section of the first pin 104, although this need not always be the case. Further, the cross-sections of the first opening 112 and the first pin 104 can comprise other, non-circular shapes in some embodiments.

Similarly, in the illustrated embodiment, the frame member 102 also includes a second sidewall 114. The second sidewall 114 can be positioned on the frame member 102 on a side of the frame member 102 that is opposite the first sidewall 110. In the illustrated embodiment, the second sidewall 114 includes a second opening 116 defined therein. That is, the second opening 116 can be formed through and extend through the second sidewall 114. As illustrated, in some embodiments, the second opening 116 extends along a second pin axis 140. The second opening 116 can be configured to receive the second pin 106 therethrough. For example, as illustrated, the second pin 106 extends through the second opening 116 and through the second sidewall 114 of the frame member 102. The second opening 116 can be configured such that the second pin 106 is slidingly received within the second opening 116. For example, the second opening 116 can be slightly larger (e.g., 1%, 2.5%, 5%, 10%, 15%, or 20% larger) than the second pin 106 so as to allow the second pin 106 to slide back and forth through the second opening 116 along the second pin axis 140. In some embodiments, the second opening 116 is the same size as the first opening 112, although this need not be the case in all embodiments. In the illustrated embodiment, the second opening 116 is shown with a circular cross-section that corresponds to the circular cross-section of the second pin 106. In general, the cross-section of the second opening 116 is configured to correspond to the cross-section of the second pin 106, although this need not always be the case. Further, the cross-sections of the second opening 116 and the second pin 106 can comprise other, non-circular shapes in some embodiments.

As shown in FIG. 2A, the frame member 102 may also include an outer sidewall 118. In the illustrated embodiment, the outer sidewall 118 extends between the first sidewall 110 and the second sidewall 114 at the top of the frame member 102 (relative to the orientation shown in the figure). Additionally, the frame member 102 can also include an inner portion 120. As shown, in some embodiments, the inner portion 120 extends between the first sidewall 110 and the second sidewall 114 at the bottom of the frame member 102 (relative to the orientation shown in the figure).

Thus, the frame member 102 can include the first sidewall 110, the second sidewall 114, the outer sidewall 118, and the inner portion 120 as illustrated, for example, in FIG. 2A. The first sidewall 110, the second sidewall 114, the outer sidewall 118, and the inner portion 120 can be arranged to define a space 122 therebetween. For example, as shown in FIG. 2A, the space 122 is bounded and defined on a first side by the first sidewall 110, on a second side by the second sidewall 114, on a third side by the outer sidewall 118, and on a fourth side by the inner portion 120. As will be described in more detail below, the compressible member 108 can be received and positioned within the space 122. That is, the compressible member 108 can be positioned between the first sidewall 110, the second sidewall 114, the outer sidewall 118, and the inner portion 120 as illustrated.

The first sidewall 110, the second sidewall 114, the outer sidewall 118, and the inner portion 120 can be arranged such that the frame member 102 comprises a keyed-profile 124. When used with reference to the frame member 102, the term "profile" refers to the outer profile or outer shape of the frame member 102 when viewed from above (e.g., as shown in FIG. 2C) or below. For example, in the illustrated embodiment, the profile of the frame member 102 comprises a generally four-sided, wedge-like shape with rounded corners. Certain features of this shape will be described in more detail below with reference to FIG. 2C. Additionally, the illustrated profile is provided by way of example only and other profile shapes for the frame member 102 are possible. The profile of the frame member 102 is referred to as "keyed" because, as will be described below with reference to FIGS. 3 and 4, it can be configured to fit within a corresponding keyed-recess 158 when mounted to the robotic arm 10.

With continued reference to FIG. 2A, features present in some embodiments of the first pin 104 and the second pin 106 will now be described. In the illustrated embodiment, the first pin 104 comprises a first shaft 126. As illustrated, the first shaft 126 comprises a circular cross-section, although this need not be the case in all embodiments, and other cross-sectional shapes for the first shaft 126 are possible. The first shaft 126 extends along the first pin axis 132 between a first head 128 and a first distal end 130. As shown in FIG. 2A, the first shaft 126 of the first pin 104 extends through the first opening 112 of the first sidewall 110. As described above, the first shaft 126 can be slidably received within the first opening 112 such that the first pin 104 can slide back and forth through the first opening 112 along the first pin axis 132. To facilitate sliding, in some embodiments, the first shaft 126 can be slightly smaller (e.g., about 1%, 2.5%, 5%, 10%, 15%, or 20% smaller) than the first opening 112.

As shown in FIG. 2A, the first head 128 of the first pin 104 can be positioned between the first sidewall 110 and the compressible member 108. In some embodiments, for example, as illustrated, the first head 128 can comprise a shape or diameter that is larger than the first opening 112. This may be included to retain the first pin 104 within the first opening 112. For example, as illustrated, the first head 128 prevents the first pin 104 from sliding completely out of the first opening 112. Thus, from the position illustrated in FIG. 2A, the first pin 104 can slide inward toward the compressible member 108 (causing the compressible member 108 to be compressed) but is limited or prevented from sliding outward (away from the compressible member) because the first head 128 does not fit through the first opening 112.

An enlarged first head 128, as illustrated in FIG. 2A, may also beneficially distribute forces onto a larger surface area of the compressible member 108. As will be described in more detail below with reference to FIGS. 7A-7C, during use of the multi-stage stop device 100, a force may be imparted on the distal end 130 of the first pin 104. The force may cause the first pin 104 to slide along the first pin axis 132 towards the compressible member 108 (causing compression of the compressible member 108). The first head 128 may contact the compressible member 108 and transfer the force acting on the first pin 104 to the compressible member 108. The enlarged first head 128 can distribute the force over a larger section of the compressible member 108.

In many respects, the second pin 106 can be similar to the first pin 104. For example, in the illustrated embodiment, the second pin 106 comprises a second shaft 134. The second shaft 134 can comprise a circular cross-section, although this need not be the case in all embodiments, and other cross-sectional shapes for the second shaft 134 are possible. The second shaft 134 extends along the second pin axis 140 between a second head 136 and a second distal end 138. As shown in FIG. 2A, the second shaft 134 of the second pin 106 extends through the second opening 116 of the second sidewall 114. As described above, the second shaft 134 can be slidably received within the second opening 116 such that the second pin 106 can slide back and forth through the second opening 116 along the second pin axis 140. To facilitate sliding, in some embodiments, the second shaft 134 can be slightly smaller (e.g., about 1%, 2.5%, 5%, 10%, 15%, or 20% smaller) than the second opening 116.

As shown in FIG. 2A, the second head 136 of the second pin 106 can be positioned between the second sidewall 114 and the compressible member 108. In some embodiments, for example, as illustrated, the second head 136 can comprise a shape or diameter that is larger than the second opening 116. This may be included to retain the second pin 106 within the second opening 116. As illustrated, the second head 134 prevents the second pin 106 from sliding completely out of the second opening 116. Thus, from the position illustrated in FIG. 2A, the second pin 106 can slide inward toward the compressible member 108 (causing the compressible member 108 to be compressed) but is limited or prevented from sliding outward (away from the compressible member) because the second head 136 does not fit through the second opening 116. Similar to the first pin 104, an enlarged second head 136 on the second pin 106, as illustrated in FIG. 2A, may also beneficially distribute forces onto a larger surface area of the compressible member 108.

The first pin 104 and the second pin 106 can be made from a strong, rigid material, such as many types of metals. In some embodiments, the first pin 104 and the second pin 106 are made from steel. In some embodiments, the first pin 104 and the second pin 106 are cast. In some embodiments, the first pin 104 and the second pin 106 are identical.

As illustrated in FIG. 2A, in some embodiments, the compressible member 108 is positioned within the space 122 between the first head 128 of the first pin 104 and the second head 136 of the second pin 106. More specifically, in some embodiments, the first head 128 of the first pin 104 acts on a first wall 142 of the compressible member 108 and the second head 136 of the second pin 106 acts on a second wall 144 of the compressible member 108. Thus, in some embodiments, a force acting on either the first distal end 130 of the first pin 104 or the second distal end 138 of the second pin 106 may be transmitted to the compressible member 108 by the first pin 104 or the second pin 106. If the force is sufficient, it may cause the compressible member 108 to compress, which can beneficially absorb the force. As mentioned above, this may provide the first stage of the multi-stage stop device 100. For example, in the event of a collision, some of the force may be absorbed by compression of the compressible member 108, as explained in further detail below with reference to FIGS. 7A-7C.

The illustrated embodiment, which includes the first pin 104 and the second pin 106 on opposite sides of the compressible member 108, may beneficially be used to limit rotational motion in both rotational directions. Further, the design may be advantageous because it can be configured to use a single compressible member 108 which is acted upon by both the first pin 104 and the second pin 106. Such a configuration may advantageously reduce the size of the multi-stage stop device 100 allowing it to be installed in small spaces. Although the illustrated embodiment includes the first pin 104 and the second pin 106, in some embodiments, only a single pin may be included. A single pin device may be used to limit rotation in only a single direction.

In the illustrated embodiment, the compressible member 108 comprises a hexagonal shape. This need not be the case in all embodiments, and other shapes for the compressible member 108 are possible.

As shown in the illustrated embodiment of FIG. 2A, the compressible member 108 can comprise a block of material. The material can be selected to have a hardness that is configured to absorb forces to be expected during a collision. The forces expected during a collision can be determined based on consideration of various parameters of the robotic arm, including, for example, the size and weight of the robotic arm and various links thereof, the speed at which the robotic arm rotates, the potential payloads with which the robotic arm operates, and the placement of the multi-stage stop device 100.

For example, larger, heavier robotic arms working with heavier payloads may produce larger forces during collision than smaller, lighter robotic arms working with lighter payloads. As another example, robotic arms operating at higher speeds may produce larger forces during collision than robotic arms working at slower speeds. As another example, a multi-stage stop device 100 placed closer to an axis of rotation may experience larger forces during a collision than a multi-stage stop device 100 placed further from an axis of rotation.

In some embodiments, when higher forces are expected, the compressible member 108 may comprise a harder material. In some embodiments, the material of the compressible member 108 may have a shore hardness of at least about 40 A, 50 A, 60 A, 70 A, 80 A, 90 A, 100 A, 10 D, 20 D, 30 D, 40 D, 50 D, 60 D, 70 D, 75 D, 80 D, 90 D, or 100 D. In some embodiments, the compressible member 108 may comprise a rubber material. In some embodiments, the compressible member 108 may comprise a spring.

Figure 4:
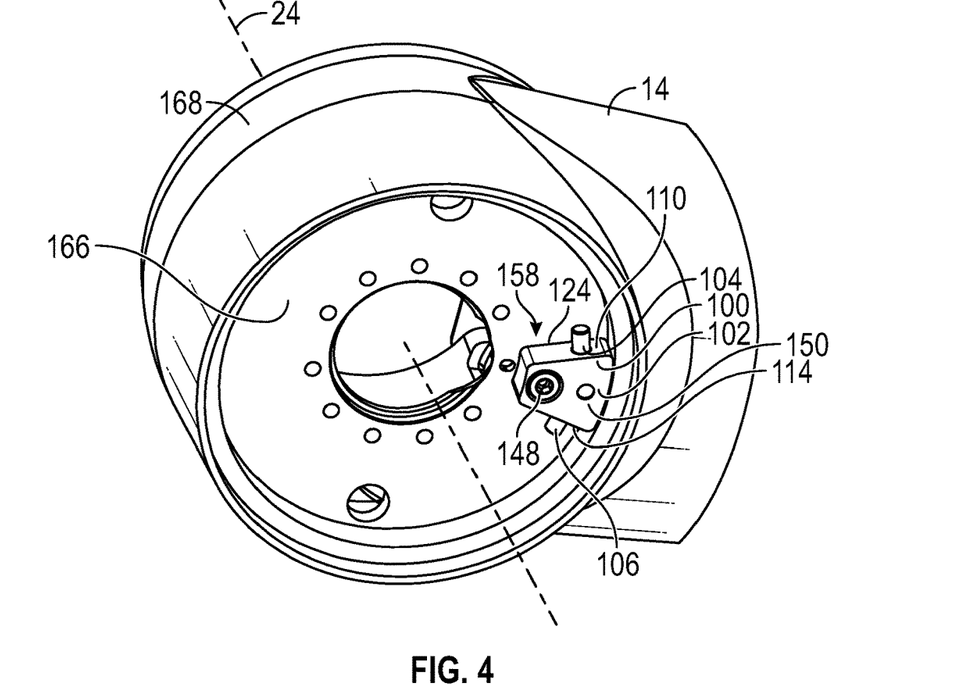
FIG. 4 is a perspective view illustrating the multi-stage stop device of FIG. 2A installed in the keyed-recess of FIG. 3.

In some embodiments, for example, as illustrated in FIG. 2A, the multi-stage stop device 100 can include a mounting aperture 146 configured to receive a fastener 148 for attaching the multi-stage stop device 100 to the robotic arm 10. In the illustrated embodiment, the mounting aperture 146 is formed through the inner portion 120 of the frame member 102. In the illustrated embodiment, the fastener 148 comprises a bolt as shown. Other mechanisms for securing the multi-stage stop device 100 to the robotic arm 10 are also possible. FIG. 4, described below, shows one example of the multi-stage stop device 100 in an installed position.

FIG. 2B is a bottom perspective view of the multi-stage stop device 100. As illustrated in FIG. 2B, in some embodiments, the frame member 102 further includes a bottom wall 150 (i.e., bottom wall, according to its configuration as installed in the robotic device of FIG. 1). The bottom wall 150 can extend between the first sidewall 110, the second sidewall 114, the outer sidewall 118, and the inner portion 120. The bottom wall 150 can partially define the space 122 in which the compressible member 108 is positioned. In some embodiments, the bottom wall 150 includes an aperture 152 formed therein as shown.

FIG. 2C is a top view of the multi-stage stop device 100 and illustrates that, in some embodiments, some aspects of the profile 124 of the frame member 102 can be determined in part based on the placement of the multi-stage stop device 100 relative to an axis of rotation 154 of a rotational joint at which the multi-stage stop device 100 is installed. As shown in FIG. 2C, the first sidewall 110 and the second sidewall 114 may be formed at an angle α relative to each other. The angle α may give the frame member 102 a wedge-like shape as shown. The angle α can be configured such that the planes of the first sidewall 110 and the second sidewall 114 intersect at the axis of rotation 154. Such an angle α may provide that the first and second pin axes 132, 140 are tangent to circle 156 formed at a radius R from the axis of rotation. The first and second pins 104, 106 may be positioned at the radius R from the circle 156. An angle β formed between the first wall 142 and the second wall 144 of the compressible member 108 may be substantially or about equal to the angle α. This may provide that the forces imported by the first pin 104 or the second pin 106 on the compressible member 108 act in a direction that is normal to the first wall 142 or the second wall 144. In some embodiments, this configuration may facilitate installation of the multi-stage stop device 100 on the interior of the robotic arm 10.

Figure 3:
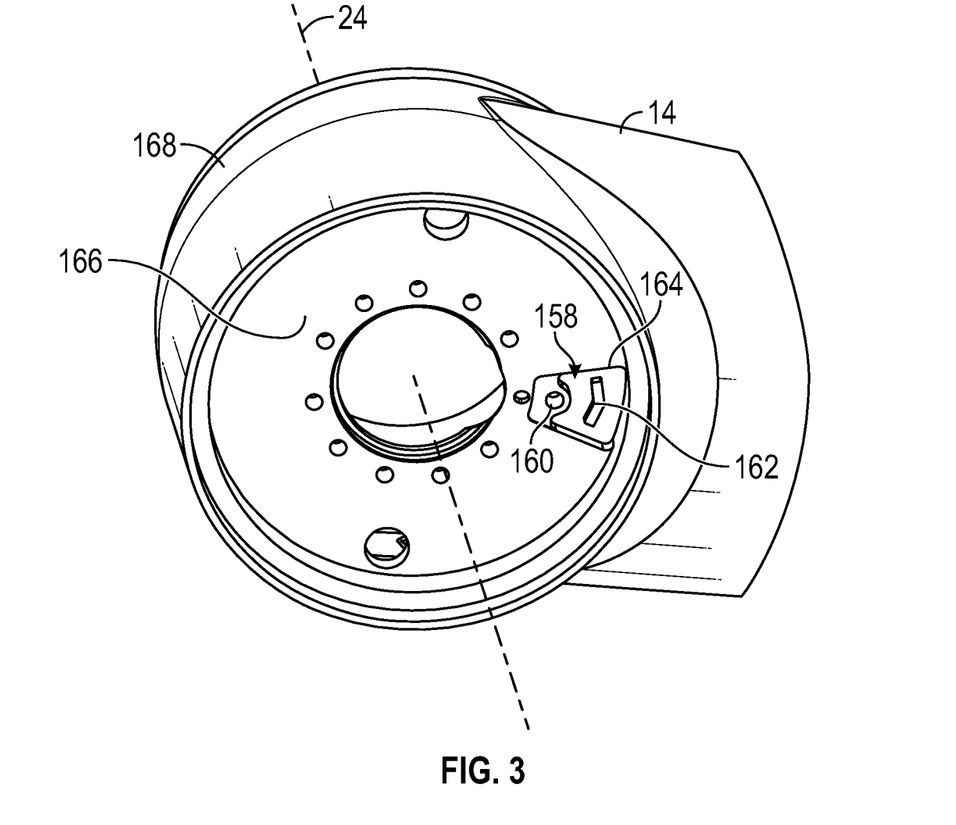
FIG. 3 is a perspective view illustrating a portion of an embodiment of a first link of the robotic arm of FIG. 1 that includes a keyed-recess configured to receive the multi-stage stop device of FIG. 2A.

FIG. 3 is a perspective view illustrating an embodiment of a keyed-recess 158 configured to receive the multi-stage stop device 100 of FIGS. 2A-2C. In the illustrated embodiment, the keyed-recess 158 is formed on the first link 14 of the robotic arm 10 of FIG. 1. In particular, in the illustrated embodiment, the keyed-recess 158 is formed on an internal portion or surface 166 of a housing 168 of the first link 14. The internal portion or surface 166 of the housing 168 may be a portion of the first link 14 that is not visible when the robotic arm 10 is assembled. In some embodiments, the internal portion or surface 166 of the housing 168 may face an internal surface or portion 170 of the base 12 when the robotic arm 10 is assembled (see, for example, FIG. 5). In some embodiments, however, the keyed-recess 158 can be positioned on an external portion or surface of the housing 168. Further, as will be described further below, the keyed-recess 158 may be formed in different locations as well. For example, in some embodiments, the keyed-recess 158 may be formed on an internal or external surface of the base 12. In some embodiments, the multi-stage stop device 100 can be positioned in a joint between two links of a robotic arm. Accordingly, in some embodiments, the keyed-recess 158 can be positioned on either of the links.

As shown in FIG. 3, the keyed-recess 158 is configured in shape and size to correspond to the keyed-profile 124 of the frame member 102 of the multi-stage stop device 100. The keyed-recess 158 may be configured to closely receive the multi-stage stop device 100, such that, when the multi-stage stop device 100 is positioned within the keyed-recess 158, play (e.g., relative movement, clearance, lash, etc.) between the multi-stage stop device 100 and the keyed-recess 158 is limited.

The keyed-recess 158 can include a mounting aperture 160 as shown. The mounting aperture 160 can be configured to receive a portion of the fastener 148 of the multi-stage stop device 100 to secure the multi-stage stop device 100 into the keyed-recess 158. For example, the fastener 148 can extend through the mounting aperture 146 of the frame member 102 of the multi-stage stop device 100 and into the mounting aperture 160 of the keyed-recess 158. In some embodiments, the fastener 148 comprises a bolt and the mounting aperture 160 is threaded to receive a threaded end of the bolt.

In some embodiments, the keyed-recess 158 also include a protrusion 162 as illustrated. The protrusion 162 may be configured to extend partially into the space 122 of the multi-stage stop device 100 to hold the compressible member 108 in place. For example, in the illustrated embodiment, the protrusion 162 comprises a V-like shape configured to extend into the space 122 between the first sidewall 110 and the second sidewall 114 of the frame member 102 and to contact a surface of the compressible member 108. Although the protrusion 162 is illustrated with a V-like shape, in other embodiments, the protrusion 162 may comprise other shapes.

As noted above, the keyed-recess 158 is configured to at least partially receive the multi-stage stop device 100 therein. This may serve one or more beneficial purposes. For example, the keyed-recess 158 may serve to ensure that the multi-stage stop device 100 is correctly oriented and positioned when installed. Engagement between the keyed-recess 158 and the keyed-profile 124 of the multi-stage stop device 100 may, in some embodiments, ensure or help to ensure that the multi-stage stop device 100 can only be installed in a single position and orientation. This may prevent or reduce the likelihood that the multi-stage stop device 100 is incorrectly installed and correctly position the multi-stage stop device 100 relative to the axis of rotation 24 (see also FIG. 2C, showing the relative position between the multi-stage stop device 100 and the axis of rotation 154).

As another example, engagement between the keyed-recess 158 and the keyed-profile 124 of the multi-stage stop device 100 may beneficially transfer forces between the multi-stage stop device 100 and the portion of the robotic arm 10 to which it is attached (e.g., the first link 14 in the illustrated example). For example, during a collision, forces acting on the multi-stage stop device 100 can be transferred between the multi-stage stop device 100 and the first link 14 through contact between the multi-stage stop device 100 and the walls 164 of the keyed-recess 158. This may advantageously distribute the forces that could potentially shear the fastener 148 if the fastener 148 were the only mechanism securing the multi-stage stop device 100 to the first link 14. Thus, a system that incorporates the multi-stage stop device 100 and a keyed-recess 158 may, in some embodiments, be capable of handling higher forces than a system that does not include the keyed-recess 158. Still, in some embodiments in which the forces are lower, the multi-stage stop device 100 may be used without a keyed-recess 158.

FIG. 4 is a perspective view illustrating the multi-stage stop device 100 installed in the keyed-recess 158 of FIG. 3. As illustrated, the frame member 102 is closely received within the keyed-recess 158 due to the corresponding nature of the keyed-profile 124 and the keyed-recess 158. As noted above, this can beneficially ensure that the multi-stage stop device 100 is correctly oriented and positioned and transfer forces between the multi-stage stop device 100 and the first link 14. Further, as illustrated, the fastener 148 can secure the multi-stage stop device 100 into the keyed-recess 158. The fastener 148 can comprise, for example, a mechanical fastener such as a bolt.

In the illustrated embodiment, when installed, the multi-stage stop device 100 is positioned on the internal surface or portion 166 of the housing 168 of the first link 14. Positioning the multi-stage stop device 100 on an internal surface or portion 166 of the housing 168 may be advantageous because it may conceal the multi-stage stop device 100, improving the look of the robotic arm 10. In other embodiments, the multi-stage stop device 100 can be positioned on an external surface or portion of the housing 168 of the first link 14 or on an internal or external surface or portion of the base 12.

Figure 5:
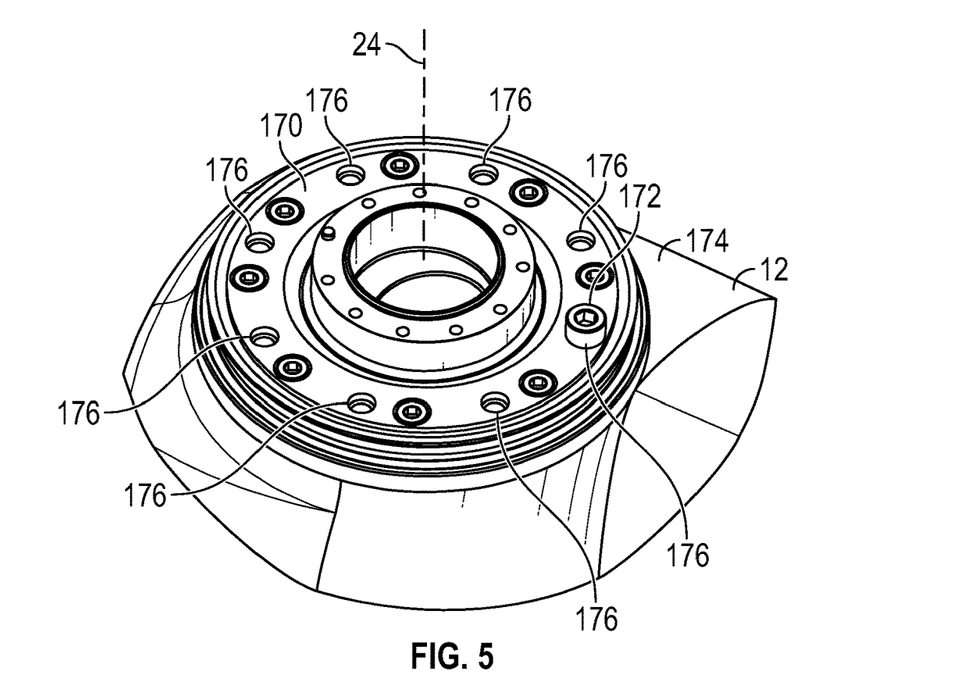
FIG. 5 is a perspective view illustrating a portion of a base of the robotic arm of FIG. 1 that includes a protruding member configured to contact the multi-stage stop device to limit rotation of the first link of the robotic arm.

FIG. 5 is a perspective view illustrating a portion of the base 12 of the robotic arm 10 of FIG. 1 that includes a protruding member 172 configured to contact the multi-stage stop device 100 to limit or stop rotation of the first link 14 relative to the base 12 about the axis of rotation 24. In the illustrated embodiment, the protruding member 172 protrudes from an internal portion or surface 170 of a housing 174 of the base 12. The internal portion or surface 170 of the housing 174 may be a portion of the base 12 that is not visible when the robotic arm 10 is assembled. In some embodiments, the internal portion or surface 170 of the housing 174 may face the internal surface or portion 166 of the first link 14 when the robotic arm 10 is assembled (see, for example, FIGS. 4 and 5).

The protruding member 172 is positioned so as to come into contact with the first pin 104 and/or the second pin 106 of the multi-stage stop device 100 as the first link 14 rotates relative to the base 12. Accordingly, if the multi-stage stop device 100 is positioned on an internal portion or surface of the first link 14, the protruding member 172 can be positioned on a corresponding internal portion or surface of the base 12 (or vice versa). Similarly, if the multi-stage stop device 100 is positioned on an external portion or surface of the first link 14, the protruding member 172 can be positioned on a corresponding external portion or surface of the base 12 (or vice versa). In some embodiments, the multi-stage stop device 100 can be positioned on an internal portion or surface of the first link 14, and the protruding member 172 can be positioned on a corresponding external portion or surface of the base 12 (or vice versa).

The protruding member 172 can be positioned at the same distance from the axis of rotation 24 as the first pin 104 and the second pin 106 so that the protruding member 172 comes into contact with the first pin 104 and/or the second pin 106 during rotation of the first link 14 relative to the base 12. As will be described with more detail with reference to FIGS. 7A-7C, the contact between the protruding member 172 and the first pin 104 and/or the second pin 106 limits or stops rotation of the first link 14 relative to the base 12.

In some embodiments, for example, as illustrated, the protruding member 172 may comprise a bolt. In the illustrated embodiment, the bolt head protrudes from the internal surface or portion 170 of the base 12 in a position so as to contact the first pin 104 and/or the second pin 106 during rotation of the first link 14 relative to the base 12. As shown in FIG. 5, in some embodiments, the internal surface or portion 170 of the base 12 may include a plurality of positions 176 at which the protruding member 172 can be installed. For example, in FIG. 5, the internal surface or portion 170 of the base 12 includes eight positions 176 at which the protruding member 172 can be installed. In the illustrated embodiment, the eight positions 176 comprises eight bolt holes into which the bolt can be installed. In some embodiments, other numbers of positions 176 (e.g., one, two, three, four, five, six, etc.) can be included. The different positions 176 allow the protruding member 172 to be installed in different locations so that the protruding member 172 contacts the first pin 104 and/or the second pin 106 at different rotational positions during the rotation of the first link 14 relative to the base 12. Further, in some embodiments, more than one protruding member 172 can be installed so as to limit the range of rotational motion between the first link 14 and base 12, as shown in FIG. 6B described below.

Figure 6A:
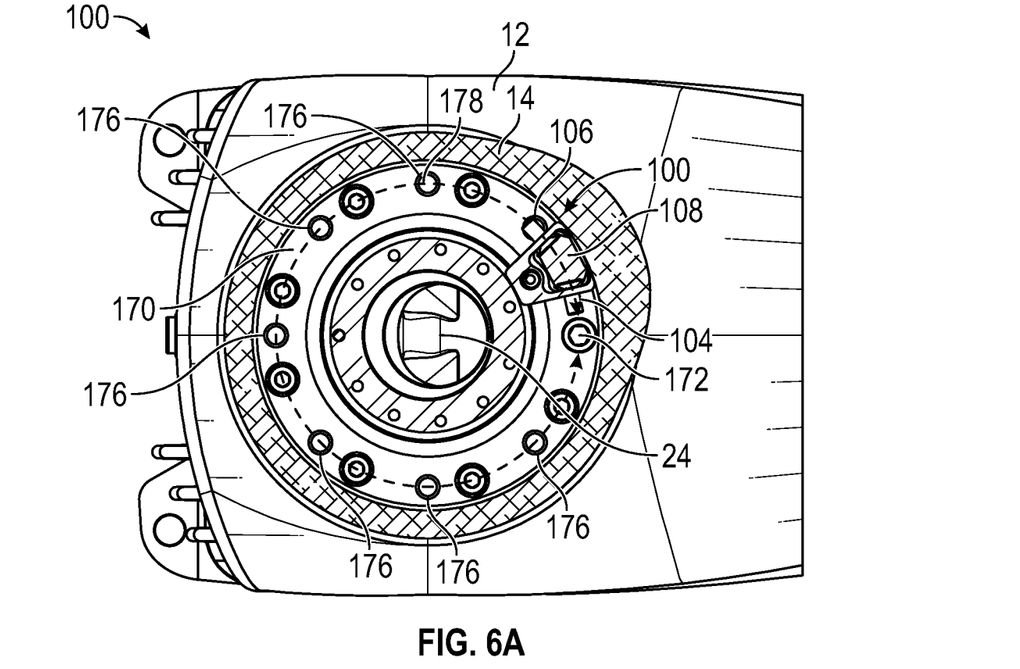
FIG. 6A is a cross-sectional view of the robotic arm of FIG. 1 taken through a rotational joint between the base and the first link so as to illustrate the multi-stage stop device and protruding member.

FIG. 6A is a cross-sectional view of the robotic arm 10 of FIG. 1 taken through the rotational joint 20 (see FIG. 1) between the base 12 and the first link 14 so as to illustrate the multi-stage stop device 100 and protruding member 172 according to a first embodiment. This illustrated embodiment includes a single protruding member 172 as shown. As such, the first link 14 can rotate relative to the base 12 about the axis of rotation 24 with a rotational range 178 as illustrated. At the extremes of the rotational range 178 (illustrated with arrow heads on the dashed line) the first pin 104 and the second pin 106 come into contact with the protruding member 172 so as to limit and stop rotation.

Figure 6B:
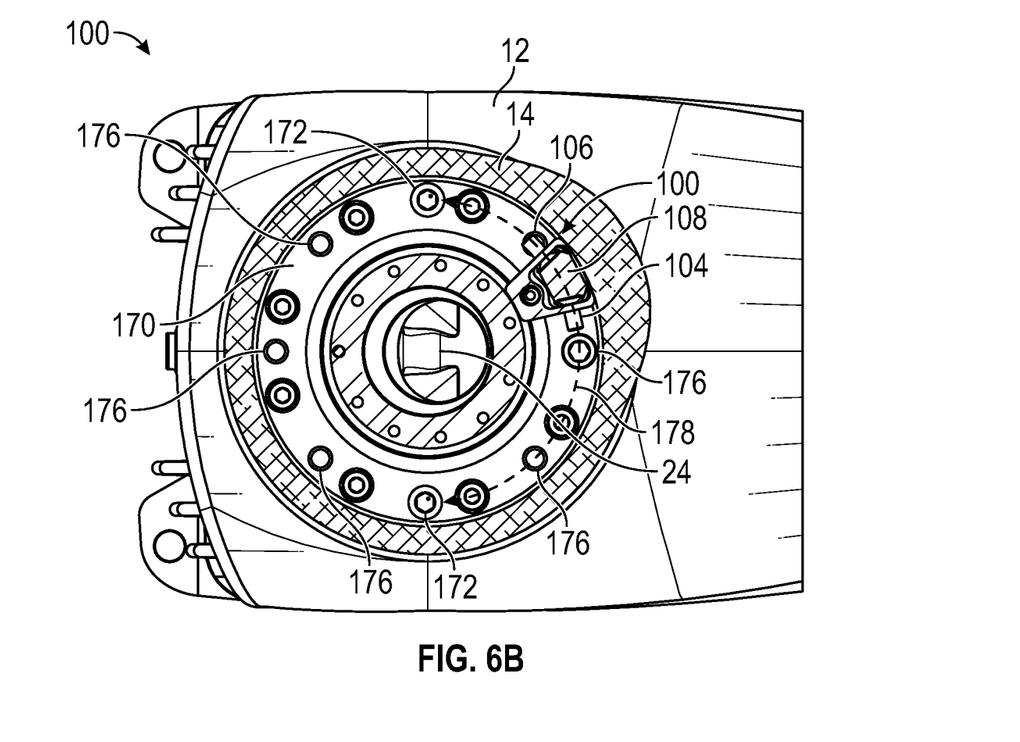
FIG. 6B is another cross-sectional view of the robotic arm of FIG. 1 taken through a rotational joint between the base and the first link in an embodiment that includes the multi-stage stop device and two protruding members.

FIG. 6B is another cross-sectional view of the robotic arm 10 of FIG. 1 taken through the rotational joint 20 between the base 12 and the first link 14 in an embodiment that includes the multi-stage stop device 100 and two protruding members 172 positioned as shown. In this embodiment, the rotational range 178 is reduced as the first link 14 can only rotate relative to the base 12 in the rotational range 178 between the two protruding members 172.

As will be apparent to those of ordinary skill in the art upon consideration of FIGS. 6A and 6B (as well as the disclosure generally), it is possible to adjust the rotational range 178 of the first link 14 relative to the base 12 by adjusting the position and number (e.g., use of one or two) protruding members 172. As noted above, the protruding member(s) 172 can be installed in any of the possible positions 176.

Figure 7A:
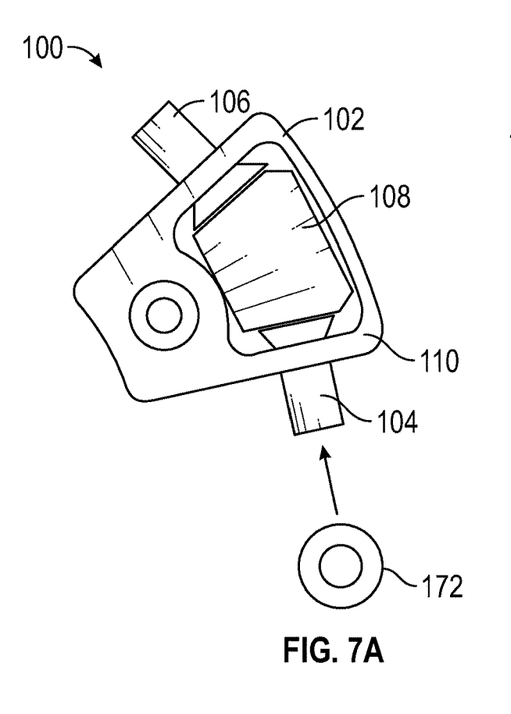
FIG. 7A illustrates an example of the multi-stage stop device prior to contact with the protruding member.
Figure 7B:
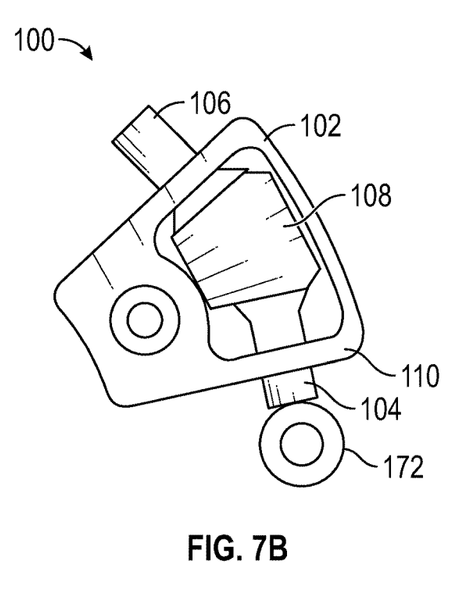
FIG. 7B illustrates an example of the multi-stage stop device during contact with the protruding member. In this example, the protruding member is contacting a distal end of a pin of the multi-stage stop device, causing the pin to compress a compressible member of the multi-stage stop device.
Figure 7C:
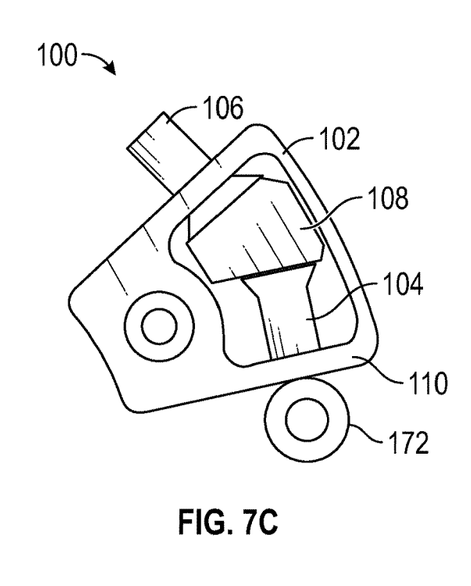
FIG. 7C illustrates an example of the multi-stage stop device during contact with the protruding member. In this example, the protruding member is contacting a sidewall of the multi-stage stop device.

At each extreme of the rotational range 178, one of the first pin 104 and the second pin 106 comes into contact with the protruding member 172. FIGS. 7A-7C illustrate the function of the multi-stage stop device 100 when the multi-stage stop device 100 comes into contact with the protruding member 172. FIGS. 7A-7C illustrate contact between the first pin 104 and the protruding member 172. Contact between the second pin 106 and the protruding member 172 can be similar.

FIG. 7A illustrates the multi-stage stop device 100 prior to contact with the protruding member 172. The multi-stage stop device 100 is in a default configuration prior to contact and the compressible member 108 is in an uncompressed state. As the first link 14 rotates relative to the base 12, the protruding member 172 approaches the first pin 104 in the direction illustrated by the arrow.

FIG. 7B illustrates an example of the "first stage" of the multi-stage stop device 100 during contact with the protruding member 172. In this example, as the protruding member 172 contacts the distal end of the first pin 104 of the multi-stage stop device 100, the first pin 104 is driven inward, compressing the compressible member 108 of the multi-stage stop device 100. In some embodiments, compression of the compressible member 108 absorbs and dissipates the force of the collision between the protruding member 172 and the multi-stage stop device 100. The first stage of the multi-stage stop device 100 may be a compliant stage that occurs as the first pin 104 compresses the compressible member 108.

FIG. 7C illustrates an example of the "second stage" of the multi-stage stop device 100 during contact with the protruding member 172. In this example, the protruding member 172 has driven the first pin 104 completely in, such that the protruding member 172 now contacts the first sidewall 110 of the multi-stage stop device 100. The first sidewall 110 serves as a hard stop, preventing further rotation of the first link 14 relative to the base 12. The second stage of the multi-stage stop device 100 may be a hard stop stage that occurs when the protruding member comes into contact with the first sidewall 110 of the multi-stage stop device 100 preventing any further rotation.

The multi-stage stop device 100 as described herein may provide advantages not achieved may other types of mechanical stop devices. Other mechanical stop devices generally comprises only a hard stop that abruptly stops rotation. These other hard stops are often formed by direct bolt-on-bolt or bolt-on-rubber contact, which can cause significant wear to the robotic arm on which they are installed. Further, these other hard stops are often positioned on the exterior of the robotic arm, which can be disadvantageous. Finally, these other hard stops are generally positioned in a predetermined location, such that the user is unable to adjust the arm's angle of rotation.

In contrast, the multi-stage stop devices 100 described herein can advantageously include a first compliant stage and a second hard stop stage that can reduce wear on the robotic arm. Additionally, the multi-stage stop devices 100 can be positioned within the interior of the robotic arm (as in the examples described above). Finally, the multi-stage stop devices 100 are adjustable by moving the protruding member 172 to any of the available positions 176 (see FIGS. 5, 6A, and 6B).

A multi-stage stop device as shown in FIG. 2A has been tested on a robotic arm 10 as shown in FIG. 1 and successfully stopped the rotation about axis 24 while surviving a collision at full speed and full payload. The compressible member 108 that was tested had a shore hardness of 75 D. This, however, is only one example, and many other embodiments are possible as described above.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (e.g., top, bottom, side, up, down, inward, outward, etc.) are generally used with reference to the orientation shown in the figures and are not intended to be limiting. For example, the top surface described above can refer to a bottom surface or a side surface. Thus, features described on the top surface may be included on a bottom surface, a side surface, or any other surface.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods and materials of the present invention(s). This invention(s) is susceptible to modifications in the methods and materials, as well as alterations in the fabrication methods and equipment. Such modifications will become apparent to those skilled in the art from a consideration of this disclosure or practice of the invention(s) disclosed herein. Consequently, it is not intended that this invention(s) be limited to the specific embodiments disclosed herein, but that it cover all modifications and alternatives coming within the true scope and spirit of the invention(s) as embodied in the attached claims.

What is claimed is:

1. A multi-stage stop device for a robotic arm, the device comprising:
   a frame member configured to mount to one of a first link and a base of a robotic arm, wherein the first link and the base are connected by a rotational joint such that the first link rotates relative to the base, the frame member comprising a first sidewall defining a first opening therethrough;
   a compressible member positioned within the frame member; and
   a first pin comprising a first shaft extending from a first head to a first distal end, wherein the first shaft is slidably received within the first opening of the first sidewall and the first head is positioned between the first sidewall and the compressible member,
   wherein the frame member further comprises a second sidewall defining a second opening therethrough, and
   wherein the device further comprises a second pin comprising a second shaft extending from a second head to a second distal end, wherein the second shaft is slidably received within the second opening of the second sidewall and the second head is positioned between the second sidewall and the compressible member.

2. The device of claim 1, wherein a first force acting on the first distal end of the first pin causes the first pin to move towards the compressible member, compressing the compressible member to absorb the first force.

3. The device of claim 2, wherein contact between the frame member and a protruding member on the one of the first link and the base stops rotation of the first link relative to the base.

4. The device of claim 1, wherein a second force acting on the second distal end of the second pin causes the second pin to move towards the compressible member, compressing the compressible member to absorb the second force.

5. The device of claim 1, wherein the compressible member comprises a block of rubber having a shore hardness of at least 40A.

6. The device of claim 1, further comprising a mechanical fastener extending through the frame member for mounting the frame member to the one of the first link and the base of the robotic arm.

7. A multi-stage stop device for a robotic arm, the device comprising:
   a frame member configured to mount to one of a first link and a base of a robotic arm, wherein the first link and the base are connected by a rotational joint such that the first link rotates relative to the base, the frame member comprising a first sidewall defining a first opening therethrough;
   a compressible member positioned within the frame member; and
   a first pin comprising a first shaft extending from a first head to a first distal end, wherein the first shaft is slidably received within the first opening of the first sidewall and the first head is positioned between the first sidewall and the compressible member, wherein:
   the frame member comprises a keyed-profile configured to correspond with a keyed-recess of the one of the first link and the base of the robotic arm to which the frame member is configured to mount, and
   when mounted to the one of the first link and the base of the robotic arm, the frame member is at least partially received within the keyed-recess.

8. A multi-stage stop device for a robotic arm, the device comprising:
   a frame member configured to mount to one of a first link and a base of a robotic arm, wherein the first link and the base are connected by a rotational joint such that the first link rotates relative to the base, the frame member comprising a first sidewall defining a first opening therethrough;
   a compressible member positioned within the frame member; and
   a first pin comprising a first shaft extending from a first head to a first distal end, wherein the first shaft is slidably received within the first opening of the first sidewall and the first head is positioned between the first sidewall and the compressible member, wherein the first head comprises a shape that is larger than the first opening.

9. A robotic system, comprising:
a first link of a robotic arm connected to a base by a rotational joint such that the first link rotates relative to the base; and
a multi-stage stop device, comprising:
a frame member mounted to one of the first link and the base, the frame member comprising a first sidewall defining a first opening therethrough,
a compressible member positioned within the frame member, and
a first pin comprising a first shaft extending from a first head to a first distal end, wherein the first shaft is slidably received within the first opening of the first sidewall and the first head is positioned between the first sidewall and the compressible member; and
a first protruding member mounted to the other of the first link and the base, the first protruding member positioned so as to contact the first distal end of the first pin at a first rotational position of the first link relative to the base to limit rotation of the first link in a first rotational direction,
wherein the frame member further comprises a second sidewall defining a second opening therethrough, and
wherein the device further comprises a second pin comprising a second shaft extending from a second head to a second distal end, wherein the second shaft is slidably received within the second opening of the second sidewall and the second head is positioned between the second sidewall and the compressible member.

10. The system of claim 9, wherein the first protruding member comprises a bolt.

11. The system of claim 10, wherein the first protruding member contacts the second distal end of the second pin at a second rotational position to limit rotation of the first link in a second rotational direction.

12. The system of claim 9, further comprising a mechanical fastener extending through a mounting opening of the frame member and into the one of the first link and the base to mount the frame member to the one of the first link and the base.

13. The system of claim 9, wherein the frame member is mounted to an internal portion of a housing of the one of the first link and the base.

14. The system of claim 9, wherein the frame member is mounted to the first link.

15. The system of claim 9, wherein the compressible member comprises a block of rubber having a shore hardness of at least 40A.

16. A robotic system, comprising:
a first link of a robotic arm connected to a base by a rotational joint such that the first link rotates relative to the base; and
a multi-stage stop device, comprising:
a frame member mounted to one of the first link and the base, the frame member comprising a first sidewall defining a first opening therethrough,
a compressible member positioned within the frame member, and
a first pin comprising a first shaft extending from a first head to a first distal end, wherein the first shaft is slidably received within the first opening of the first sidewall and the first head is positioned between the first sidewall and the compressible member;
a first protruding member mounted to the other of the first link and the base, the first protruding member positioned so as to contact the first distal end of the first pin at a first rotational position of the first link relative to the base to limit rotation of the first link in a first rotational direction; and
a second protruding member mounted to the other of the first link and the base, the second protruding member positioned so as to contact the second distal end of the second pin at a second rotational position of first link relative to the base to limit rotation of the first link in a second rotational direction.

17. The system of claim 16, wherein the second protruding member comprises a bolt.

18. The system of claim 16, wherein positions of the first and second protruding members are adjustable.

19. A robotic system, comprising:
a first link of a robotic arm connected to a base by a rotational joint such that the first link rotates relative to the base; and
a multi-stage stop device, comprising:
a frame member mounted to one of the first link and the base, the frame member comprising a first sidewall defining a first opening therethrough,
a compressible member positioned within the frame member, and
a first pin comprising a first shaft extending from a first head to a first distal end, wherein the first shaft is slidably received within the first opening of the first sidewall and the first head is positioned between the first sidewall and the compressible member; and
a first protruding member mounted to the other of the first link and the base, the first protruding member positioned so as to contact the first distal end of the first pin at a first rotational position of the first link relative to the base to limit rotation of the first link in a first rotational direction, wherein:
the one of the first link and the base comprises a keyed-recess;
the frame member comprises a keyed-profile configured to correspond to the keyed-recess; and
the frame member is at least partially received within the keyed-recess.

* * * * *

UNITED STATES PATENT AND TRADEMARK OFFICE
CERTIFICATE OF CORRECTION

PATENT NO. : 11,673,259 B2
APPLICATION NO. : 17/593164
DATED : June 13, 2023
INVENTOR(S) : Daniel P. Norboe It is certified that error appears in the above-identified patent and that said Letters Patent is hereby corrected as shown below:

In the Claims

Column 17, Line 36, Claim 11, delete "claim 10," and insert -- claim 9, --.

Signed and Sealed this
Twenty-second Day of August, 2023

Katherine Kelly Vidal
*Director of the United States Patent and Trademark Office*